B. C. RANKIN.
VEHICLE TOP REST.
APPLICATION FILED AUG. 5, 1910.

1,042,966.

Patented Oct. 29, 1912.
2 SHEETS—SHEET 1.

Witnesses
William Smith
F. O. Parker

Inventor
Braxton C. Rankin.
By Victor J. Evans
Attorney

B. C. RANKIN.
VEHICLE TOP REST.
APPLICATION FILED AUG. 5, 1910.

1,042,966.

Patented Oct. 29, 1912.
2 SHEETS—SHEET 2.

Witnesses
William Smith

Inventor
Braxton C. Rankin
By Victor J. Evans
Attorney

UNITED STATES PATENT OFFICE.

BRAXTON C. RANKIN, OF NETTLETON, MISSISSIPPI.

VEHICLE TOP-REST.

1,042,966. Specification of Letters Patent. Patented Oct. 29, 1912.

Application filed August 5, 1910. Serial No. 575,664.

*To all whom it may concern:*

Be it known that I, BRAXTON C. RANKIN, a citizen of the United States, residing at Nettleton, in the county of Lee and State of Mississippi, have invented new and useful Improvements in Vehicle Top-Rests, of which the following is a specification.

The invention relates to a vehicle top rest, and more particularly to the class of bow rests for buggies or vehicles with folding tops.

The primary object of the invention is the provision of a rest of this character in which the top of the vehicle, when folded, will be relieved from jars or jolts, thus resisting shocks that would otherwise be imparted thereto on the travel of the vehicle over rough roads.

Another object of the invention is the provision of a bow rest for vehicle tops in which the latter is yieldably supported when in lowered or folded position, thereby absorbing all shocks caused by jars and jolts of a vehicle when in motion, thus preventing bending or breaking of the bows of the said top of the vehicle.

A further object of the invention is the provision of a device of this character which is comparatively simple in construction, requiring few parts in its production and capable of being mounted on the body of a vehicle of any ordinary well-known construction, and one that may be economically manufactured.

It is also observable that the arms of the buggy top, in folding back, will not cut the side curtains, since the curtain will be on the outside of said arms.

With these and other objects in view, the invention consists in the construction, combination and arrangement of parts, as will be hereinafter more fully described, illustrated in the accompanying drawings and pointed out in the claim hereunto appended.

Figure 1:
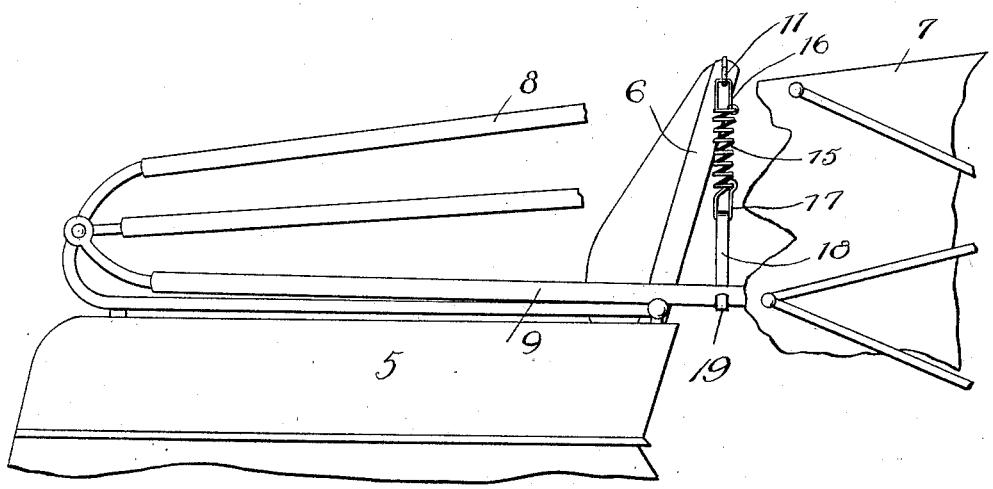
Figure 3:
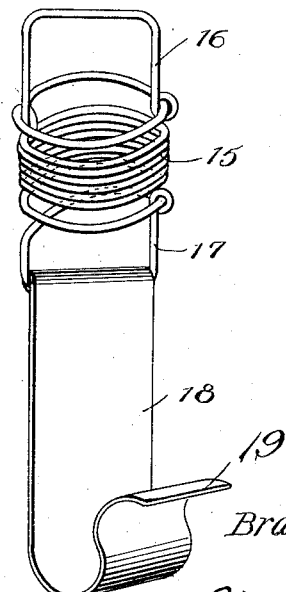
Figure 2:
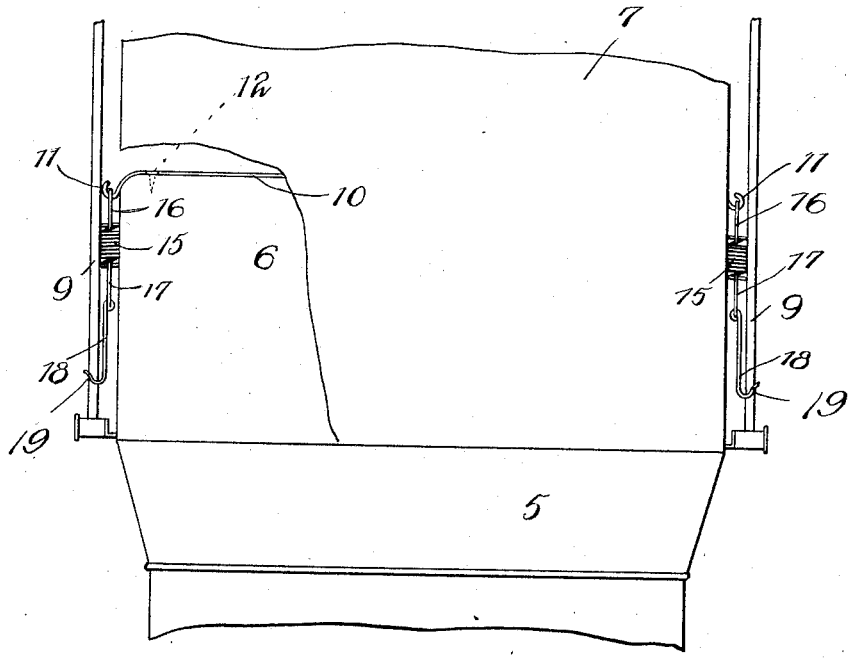
Figure 4:
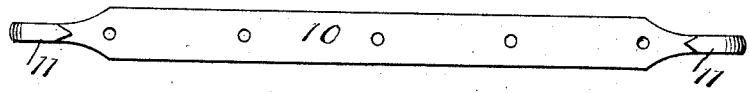

In the drawings: Figure 1 is a side elevation of a bow rest constructed in accordance with the invention, and shown applied to a buggy. Fig. 2 is a view looking toward the rear end of a buggy body with the invention in position thereon, and the top being shown in raised position. Fig. 3 is a perspective view of one of the rest devices detached from the vehicle body. Fig. 4 is a top plan view of a hanger for the rest.

Similar reference characters designate corresponding parts throughout the several views of the drawings.

Referring to the drawings by numerals, 5 designates the body of the buggy or other vehicle, from which rises the usual seat 6, the vehicle body being of the ordinary well-known construction, and to this seat 6 is secured for swinging movement a folding top 7 having the usual front and rear bows 8 and 9, respectively, the top, when folded, being adapted to rest rearwardly of the seat 6 in the usual manner. This top 7, when folded or in lowered position, is yieldably supported by a bow rest, as will be hereinafter more fully described. The bow rest in its construction comprises a flat metallic bar 10 having at opposite ends forwardly and inwardly extending hook terminals 11, the bar being co-extensive with the width of the body 5 of the vehicle, and detachably secured, by means of the usual screw fasteners 12, to the upper edge of the back of the seat rising from the said body of the vehicle. The hook terminals 11 protrude slightly beyond the ends of the back of the seat 6, and have connected thereto detachably bow rests. Each bow rest comprises a spring 15, the same being formed from a single strand of wire bent to provide a plurality of convolutions, the ends of the wire being further bent to provide loop extremities 16 and 17, the extremity 16 being connected with the hook terminal 11, and the other loop 17 having loosely connected thereto a hook-shaped catch 18. This catch is formed from a single strip of metal bent into hook-shape, the bill 19 thereof being shaped correspondingly to one-half of the cross sectional contour of the rear bow 9 of the top 7 to receive the said bow when the top is in lowered position.

It is obvious that when the top is in lowered position or on throwing back the same, the rear bows 9 will engage the catches 18, so that the entire weight of the top is carried by the bow rests, the spring 15 being of sufficient tension to absorb all shocks resulting from the roughness of the road, when the vehicle is in motion, so that jars and jolts will be relieved from the top, thus overcoming the possibility of breaking the bows of the said top, during the travel of the vehicle.

It is apparent that the device is capable of being readily detached from and mounted upon the bodies of vehicles of the ordinary well-known constructions, or those now commonly in use.

What is claimed is:

In a device of the class described, the combination with a bar having its ends provided with depending hooks, said bar being secured upon the top edge of a vehicle seat and extending longitudinally thereof; of top supporting devices, extending rearwardly of said seat, each of said devices comprising a single length of wire coiled to provide a tension spring intermediate its ends, each of said ends being bent to provide substantially U-shaped loops, the free ends of said loops being secured to the outer convolutions of the coil and at opposite ends thereof; one of said loops being adapted to detachably engage one of the hooks of said bar whereby the device may be readily removed when not in use, and a hook formed at one end to provide a loop engaging eye for loosely engaging the other U-shaped loop of said device, the other free end of said hook being formed to provide a bill for the reception of the top of a vehicle.

In testimony whereof I affix my signature in presence of two witnesses.

BRAXTON C. RANKIN.

Witnesses:
 I. W. BALLANCE,
 P. K. THOMAS.

---

Copies of this patent may be obtained for five cents each, by addressing the "Commissioner of Patents, Washington, D. C."